April 14, 1964
F. CODIGNOLA
3,129,147
RECOVERY OF ACETONE BY DISTILLATION IN
THE PRESENCE OF SODIUM PEROXIDE
Filed Sept. 7, 1960
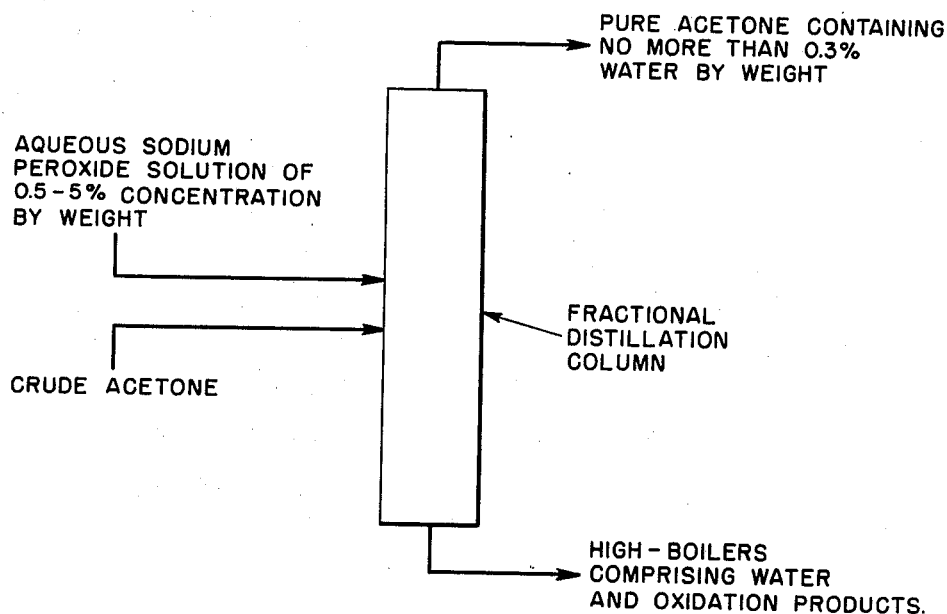

United States Patent Office 3,129,147
Patented Apr. 14, 1964

3,129,147
RECOVERY OF ACETONE BY DISTILLATION IN THE PRESENCE OF SODIUM PEROXIDE
Franco Codignola, Milan, Italy, assignor to Societá Italiana Resine, Milan, Italy
Filed Sept. 7, 1960, Ser. No. 54,346
Claims priority, application Italy July 1, 1960
3 Claims. (Cl. 202—59)

This invention concerns an improved method of purifying acetone obtained from acid dissociation of cumene hydroperoxide.

It is well-known that acetone from the acid dissociation of cumene hydroperoxide though accurately and repeatedly rectified, hardly meets prescriptions concerning residual acidity and stability to permanganate. It was attempted heretofore to obviate these drawbacks (British patent specification No. 800,763, Distillers), by treating the impure acetone during rectification with a dilute caustic soda solution.

Though the latter method was effective in reducing the residual acidity to acceptable values, it was not always sufficient to confer to acetone the necessary stability to potassium permanganate.

It has now been found that acetone largely meeting international prescriptions in respect to residual acidity and stability to permanganate can very simply be obtained by injecting into the column during rectification of raw acetone very small quantities of a dilute aqueous sodium peroxide solution. In addition to a drastic reduction in residual acidity and the extraordinary stability to permanganate it was found that, the rectifying power of the column employed being the same, the residual water content in acetone was considerably reduced.

Supply of the aqueous sodium peroxide solution is conveniently effected at a level slightly higher than the supply of the acetone to be rectified. Conventional plate columns can be employed. However, columns with a filling are more convenient, for the latter safely prevent any accumulation of sodium peroxide on the plates in the column. The conduct of operation is thereby made extremely simple and thoroughly reliable.

The accompanying drawing is a flow-down diagram illustrating the method of purifying acetone in accordance with the present invention.

The sodium peroxide solution in water may be of various concentrations; however, it will be advisable not to exceed 5% by weight, optimum results being obtained with a concentration of about 0.5%. The ratio of the sodium peroxide solution to the acetone to be rectified can be varied depending upon the properties of the acetone to be purified. Said ratio normally ranges between 0.5 and 2% of the 2% aqueous solution of peroxide to the total column content. In any case the quantity of sodium peroxide should be adequate to oxidize reducing substances contained in raw acetone.

The acetone obtained by this treatment by starting from acetone of any kind, meets the following requirements:

Stability to permanganate (according to British Standard 509/1957): minimum 4 h.
Acidity expressed as acetic acid: below 0.0020%.
Water content: below 0.3%.

The following examples further illustrate the invention without, however, limiting the latter.

*Example No. 1*

A column 30 mm. in diameter, 3000 mm. in height with a filling was employed, said column ending at the bottom with a heated flask having a tube for drawing off tail products. The top end of the column was air-cooled and opened into a water-cooled coil for drawing off acetone.

An acetone-cumene mixture containing 40% by weight of acetone was supplied to the column at a rate of 1 liter/h. at a level about 1.100 mm. above the flask. About 250 mm. higher a 1% sodium peroxide aqueous solution was fed at a rate of 18 ml./h., i.e. in a proportion of 1.8% to the acetone-cumene mixture.

By maintaining a reflux about 3 times the extraction an acetone was obtained which largerly met requirements British Standard 509/1957.

*Example No. 2*

This test was carried out similarly to Example 1; however, a 50% acetone solution in water was supplied and the quantity of sodium peroxide solution amounted to 2% to the charge. The same results as above were obtained.

*Example No. 3*

A column containing 48 plates, 1,000 mm. in diameter was fed on the 11th plate from the bottom, the sodium peroxide solution being supplied to the 14th plate, i.e. three plates higher.

The charge comprised 40% acetone, the remainder to 100 comprising cumene, alphamethylstyrene and water traces.

The charge was supplied at a rate of 1800 hectoliters/h., the quantity of sodium peroxide solution amounting to 2% of a 1% solution in water. Reflux was in an extraction-reflux ratio of 1–3, the resulting acetone largely meeting requirements British Standard 509/1957.

What I claim is:

1. A method of purifying crude acetone obtained from acid dissociation of cumene hydroperoxide comprising rectifying the crude acetone in a rectification column while supplying to the column an aqueous solution of 0.5% to 5% by weight of sodium peroxide to thereby oxidize the permanganate-reducing substances contained in pure acetone.

2. A method of purifying crude acetone obtained from acid dissociation of cumene hydroperoxide, comprising continuously distilling the raw acetone in a rectification column while supplying to the column an aqueous solution of 0.5% to 5% by weight of sodium peroxide to thereby oxidize the permanganate-reducing substances contained in the crude acetone, and drawing off distilled acetone from the top region of the column.

3. A method of purifying crude acetone obtained from acid dissociation of cumene hydroperoxide, comprising continuously supplying the crude acetone to an intermediate zone of a rectification column and distilling the acetone in the column while supplying to the column at a location above said zone an aqueous solution of 0.5% to 5% by weight of sodium peroxide to thereby oxidize the permanganate-reducing substances contained in the crude acetone, and drawing off distilled acetone from a top region of the column.

References Cited in the file of this patent

UNITED STATES PATENTS

| | | |
|---|---|---|
| 2,708,653 | Sisco et al. | May 17, 1955 |
| 2,737,480 | Adams et al. | Mar. 6, 1956 |
| 2,906,675 | Hall et al. | Sept. 29, 1959 |
| 2,971,893 | Hood | Feb. 14, 1961 |